(12) United States Patent
Lathrop et al.

(10) Patent No.: US 7,569,949 B2
(45) Date of Patent: Aug. 4, 2009

(54) TRANSFER SWITCH WITH GENERATOR MAINTENANCE INDICATOR

(75) Inventors: Todd Matthew Lathrop, Oakdale, PA (US); Bert Popovich, Carnegie, PA (US)

(73) Assignee: Eaton Corporation, Cleveland, OH (US)

( * ) Notice: Subject to any disclaimer, the term of this patent is extended or adjusted under 35 U.S.C. 154(b) by 302 days.

(21) Appl. No.: 11/627,614

(22) Filed: Jan. 26, 2007

(65) Prior Publication Data

US 2008/0180263 A1 Jul. 31, 2008

(51) Int. Cl.
*H02J 9/00* (2006.01)
(52) U.S. Cl. ............................................. 307/64
(58) Field of Classification Search .................. 307/64
See application file for complete search history.

(56) References Cited

U.S. PATENT DOCUMENTS

| | | | |
|---|---|---|---|
| 4,672,227 A | 6/1987 | Lagree et al. | |
| 4,747,061 A | 5/1988 | Lagree et al. | |
| 4,791,255 A | 12/1988 | Elilezer | |
| 4,894,796 A | 1/1990 | Engel et al. | |
| 5,397,868 A | 3/1995 | Smith et al. | |
| 5,638,295 A | 6/1997 | Lagree et al. | |
| 5,739,594 A * | 4/1998 | Sheppard et al. | 307/64 |
| 6,577,216 B2 | 6/2003 | Turner et al. | |
| 6,590,481 B2 | 7/2003 | Turner et al. | |
| 6,801,109 B2 | 10/2004 | Simms | |
| 6,849,967 B2 | 2/2005 | Lathrop et al. | |
| 6,861,930 B2 | 3/2005 | Simms et al. | |
| 6,968,259 B2 * | 11/2005 | Simons et al. | 701/30 |
| 6,995,327 B1 | 2/2006 | Shepstone et al. | |
| 2004/0155466 A1 * | 8/2004 | Sodemann et al. | 290/1 A |
| 2004/0199297 A1 | 10/2004 | Schaper et al. | |
| 2006/0028069 A1 | 2/2006 | Loucks et al. | |
| 2006/0090552 A1 * | 5/2006 | Ziegler et al. | 73/118.1 |
| 2006/0129798 A1 | 6/2006 | Bance et al. | |

* cited by examiner

*Primary Examiner*—Robert L. DeBeradinis
(74) *Attorney, Agent, or Firm*—Martin J. Moran

(57) ABSTRACT

A transfer switch having a transfer control provides electric power to a load. The transfer switch includes a power switching device provided with electric power from a first power source, such as a utility power source, and a second power source, such as a generator power source. The transfer control is structured to monitor the second power source, maintain a runtime count of the second power source, locate a piece of data concerning a maintenance procedure in a storage corresponding to a current value of the runtime count, and provide an indication of a need to perform the maintenance procedure.

21 Claims, 2 Drawing Sheets

TRANSFER SWITCH WITH GENERATOR MAINTENANCE INDICATOR

BACKGROUND OF THE INVENTION

1. Field of the Invention

This invention pertains generally to transfer switches and, more particularly, to transfer switches having an ability to monitor a generator power source. This invention also relates to methods for monitoring a generator power source and providing an indication of required maintenance.

2. Background Information

Transfer switches are employed in a wide variety of residential and commercial structures to allow an electrical load therein to be supplied with power from an alternate power source in the event of instability and/or loss of power from a main power source. A typical transfer switch installation allows an onsite backup electrical generator, serving as a generator power source, to supply electrical power in place of a utility power source on an occasion where the electrical power supplied by the utility power source has become unstable (e.g., as in the case of a brownout) or has failed, entirely.

In the interest of ensuring reliable operation, such a generator power source requires routine maintenance so that it will function properly when called upon to supply power in place of the main power source. More specifically, in the case of a generator powered, for example, by some form of internal combustion engine, there are lubricating oil, filters and other items that must be changed on a regular basis, as well as a fuel supply that must be replenished for such a generator to continue to function.

It is known to provide generator power sources with runtime counters tracking the amount of time such generator power sources have been in operation (i.e., a runtime count) as an aid to prompt personnel to carry out such routine maintenance. However, due to the high level of noise and vibration, exhaust fumes and typically unsightly appearance of such generator power sources, it is commonplace to locate such a generator power source remotely from a structure to which such a generator power source provides power. The simple fact that such a generator power source is located outside and away from such a structure typically results in gauges or other indicators mounted on such a generator power source being only infrequently checked for indications of either a prompt for routine maintenance or a malfunction. This results in routine maintenance being carried out on a less than desired basis.

Furthermore, although a generator power source may be provided with such a runtime counter, the runtime count is of little value unless personnel monitoring such a runtime count are made aware of the specific maintenance needs of the given generator power source upon the runtime count reaching a predetermined value. It is known for such generator power sources to be accompanied by various pieces of maintenance literature detailing maintenance procedures to be carried out as various runtime counts are reached. Unfortunately, the proper use of such maintenance literature requires being referred to on a recurring basis to check whether a current runtime count value signifies the need to carry out some form of maintenance procedure. In other words, for the combination of a runtime counter and maintenance literature to be effective, recurring proactive action on the part of maintenance personnel is required.

It is also known to provide a generator power source installed at a location external to a structure to which the generator power source supplies power with an indicator device maintained within the structure to provide an indication of malfunctions or events that may adversely affect operation, such as a low fuel level or overheating. In this way, such indications are provided without personnel having to go out to the location of the generator power source. However, waiting for indications of malfunctions or such adverse events to address the operational needs of a generator power source is not the same as providing routine maintenance to ensure its proper operation. Therefore, such a remote indicator device does not properly address the need of prompting proper routine maintenance.

SUMMARY OF THE INVENTION

These needs and others are met by embodiments of the invention providing a transfer switch having the ability to monitor the runtime operation of a generator power source and provide appropriate prompting of routine maintenance, including indications of when particular maintenance activities are required.

In accordance with one aspect of the invention, a transfer switch is for a first power source, a second power source, and a load. The transfer switch comprises a power switching device structured to select between the first power source and the second power source and to supply power to the load, and a transfer control. The transfer control is structured to monitor the second power source, to maintain a runtime count of the second power source, to identify a maintenance procedure corresponding to the runtime count, and to provide an indication of a need to perform the maintenance procedure.

In accordance with another aspect of the invention, a method is for monitoring a second power source structured to provide power to a transfer switch including a power switching device, the power switching device being structured to receive power from a first power source and the second power source, the power switching device being operated by a transfer control. The method comprises maintaining a runtime count of the second power source at the transfer switch, identifying a maintenance procedure corresponding to the runtime count, and providing an indication of a need to perform the maintenance procedure

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
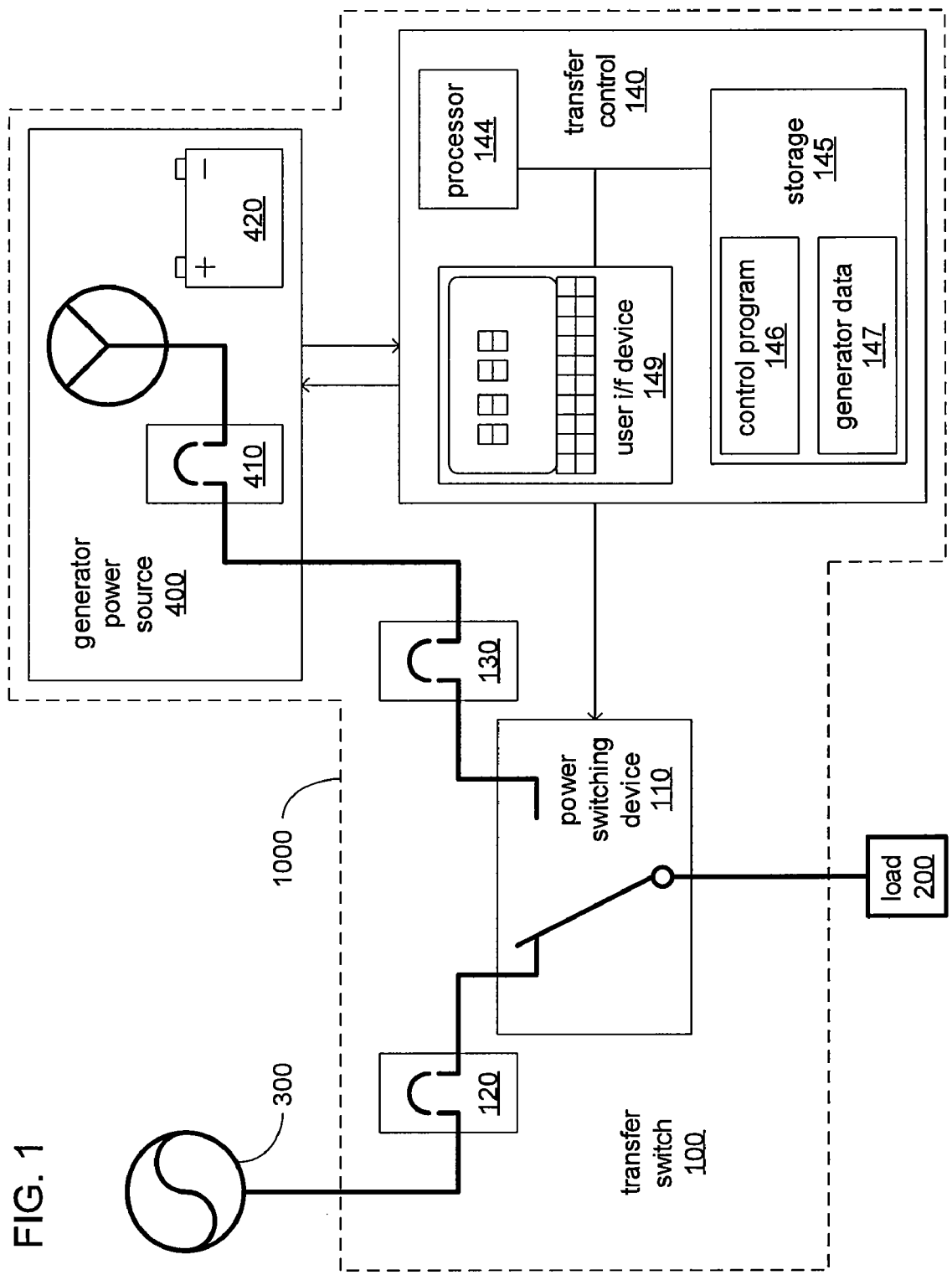
FIG. 1 is a block diagram of a transfer switch installation in accordance with embodiments of the invention.

Referring to FIG. 1, a transfer switch installation 1000 to selectively provide electrical power to a load 200 from multiple alternate sources incorporates a generator power source 400 and a transfer switch 100 receiving electric power, at various times, from one or both of a utility power source 300 and the generator power source 400. The transfer switch 100 allows the source of electric power supplied to the load 200 to be switched between the utility power source 300 and the generator power source 400. The load 200 represents one or more electrical devices within, for example, a commercial or residential structure (not shown) that requires electric power, such as for example and without limitation, lighting, plug-ins, appliances, commercial machinery and climate control systems. The utility power source 300 is a source of electric power from a commercial vendor (e.g., without limitation, a connection to an electrical grid maintained by a utility power company).

The generator power source 400 is, for example, an electric generator of a type commonly found near the exterior of a commercial or residential structure to provide a backup source of electric power to that structure in the event that the electric power supplied by the utility power source 300 becomes unstable (as in the case of a brownout) or fails, entirely. The generator power source 400 may incorporate a service disconnect 410 to disconnect power during maintenance and/or in the event of an overload of current being drawn from the generator power source 400. The generator power source 400 may be any of a wide variety of electric generators based on any of a variety of technologies, including but not limited to, solar energy, wind energy, geothermal energy, or fossil fuel energy through either a fuel cell or an internal combustion engine.

The transfer switch 100 incorporates a power switching device 110, and a transfer control 140 that operates the power switching device 110. The transfer switch 100 may also incorporate one or both of service disconnects 120 and 130. Electric power from the utility power source 300 is routed via one or more conductors to the power switching device 110, and is routed through the service disconnect 120 if the service disconnect 120 is present. Electric power from the generator power source 400 is routed via one or more conductors from the generator power source 400 to the power switching device 110, and is routed through the service disconnect 130 if the service disconnect 130 is present. The power switching device 110 is caused to select either the utility power source 300 or the generator power source 400 to supply electric power that is routed via one or more conductors from the power switching device 110 to the load 200.

As those skilled in the art will readily recognize, the power switching device 110 may be any of a wide variety of devices or combinations of devices that provide the function of both making and breaking electrical connections for the routing of electric power from one of multiple electrical sources. For example, it is widely known to use one or more sets of relays and/or contactors as a power switching device.

As those skilled in the art will also readily recognize, the service disconnects 120, 130 and 410 may be any of a wide variety of devices or combinations of devices providing both protection against too great a flow of current and manual disconnection capability. A widely known and very common form of device employed as a service disconnect is a circuit breaker. Circuit breakers commonly provide a manual operating handle by which disconnection can be effected, and/or a shunt trip (e.g., a magnetic coil that when energized by an external power source causes the circuit breaker to enter an open state). Widely known and commonly used combinations of devices serving as a service disconnect are a fuse and either a latching relay or latching contactor where disconnection is caused by breaking the circuit conveying power for latching.

The power switching device 110 is normally caused by the transfer control 140 to select the utility power source 300 as the source of electric power to be supplied to the load 200, but can be caused to select the generator power source 400 when the electric power supplied by the utility power source 300 becomes unstable or fails. The transfer control 140 is an automated electronic device operating the power switching device 110 in response to the receipt of one or more inputs. Such inputs may include, for example and without limitation, an indication of the input voltage level supplied by one or both of the utility power source 300 and the generator power source 400 failing to meet a desired specification (e.g., without limitation, failing to stay within 5% of a standard 115V level), an indication of the amount of current being drawn from either of these power sources failing to stay within a desired limit (e.g., without limitation, failing to stay below the maximum current capacity of a conductor or power source), or a timer input. The transfer control 140 may also monitor one or more aspects of the operating status of the generator power source 400, itself, such as without limitation, the amount of available fuel remaining for the generator power source 400 (e.g., without limitation, depletion of the fuel to an extent that a fuel tank is only 10% full), or the voltage level of a starting battery 420.

In embodiments of the transfer switch 100 in which one or both of the service disconnects 120 and 130 are provided, sensors monitoring the power supplied by one or both of the utility power source 300 and the generator power source 400 may be positioned between the power switching device 110 and one or both of the service disconnects 120 and 130. This may be done to detect a loss of power at one or both of the power inputs to the power switching device 110 as a result of one or both of the service disconnects 120 and 130 being opened, thereby disconnecting the power supplied by one or both of the utility power source 300 and the generator power source 400. Alternatively, the service disconnects 120, 130 and/or 410 may be structured to allow the transfer control 140 to directly monitor their status. The transfer control 140 may respond to the opening of one or more of the service disconnects 120, 130 and 410 by causing the power switching device 110 to switch between the utility power source 300 and the generator power source 400 in an effort to maintain a supply of power to the load 200.

The transfer control 140 may also be provided with the ability to turn the generator power source 400 on or off. In embodiments where the transfer control 140 is an automated electronic device, the transfer control 140 may respond to instability or complete loss of power from the utility power source 300 by signaling the generator power source 400 to turn on to provide power. The transfer control 140 may further signal the generator power source 400 to turn off when stable power is once again being supplied by the utility power source 300. The transfer control 140 may also signal the generator power source 400 to turn on or to turn off in response aspects of the operating status of the generator power source 400, itself, including without limitation, restricting the number of times the generator power source 400 is started if the voltage of the starting battery 420 is low, or restricting the amount of time the generator power source 400 is operated to conserve what remains of a low quantity of available fuel.

The transfer control 140 incorporates a processor 144 coupled to a storage 145. The processor 144 may be any of a variety of types of processing device, including, for example, a specialized processor such as a DSP or microcontroller, or a more general function processor such as a processor executing the widely known and used "X86" instruction set. The storage 145 is a machine readable storage device that may be made up of volatile and/or non-volatile forms of storage devices including, but not limited to, RAM, ROM, FLASH, EPROM, and magnetic and/or optical machine readable media, that may or may not be of a removable form. The processor 144 is further coupled to a user interface device 149, that may either be incorporated into the transfer control 140 (as depicted in FIG. 1), or may be physically separate from the transfer control 140 while being suitably either electrically or wirelessly linked to the processor 144. The user interface device 149 may incorporate, for example, a screen and keyboard, as depicted, or may incorporate any of a variety of widely known and used user interface devices, such as a touchscreen, various switches and/or hand-operable controls, audio and/or voice interfaces.

The storage 145 carries a suitable control program 146 incorporating a sequence of instructions that when executed by the processor 144, causes the processor 144 to monitor the generator power source 400, maintain a runtime count of the amount of time during which the generator power source 400 is in operation, and interact with the user interface device 149 as will be described in more detail. In some embodiments, the control program 146 may further cause the processor 144 to perform one or both of the aforedescribed automatic operation of the power switching device 110, or the aforedescribed signaling of the generator power source 400 to turn on or off. In other embodiments, one or both of these functions is performed by other circuitry within the transfer control 140 such that the processor 144 and the control program 146 are not involved. The storage 145 also carries generator data 147 incorporating data concerning at least one maintenance procedure for the generator power source 400 to be carried out upon the runtime count reaching a specific value.

More specifically, in accessing the storage 140 to retrieve and execute a sequence of instructions of the control program 146, the processor 144 is caused to maintain a runtime count of the operating time of the generator power source 400. In some embodiments, the processor 144 is caused to monitor the voltage of the power supplied by the generator power source 400 and count the amount of time during which the voltage meets a predetermined threshold. Counting the runtime of the generator power source 400 in this manner allows this feature of the transfer control 140 to be used with any generator supplied by any manufacturer, since whatever generator is employed as the generator power source 400 must provide power at a voltage within specifications that are appropriate for the load 200 (e.g. without limitation, 2-pole AC within 2% of 60 Hz and within 3% of 230V). In other embodiments, the processor 144 is caused to monitor a status signal supplied to the transfer control 140 by the generator power source 400 that indicates when the generator power source 400 is on or off. Counting the runtime of the generator power source 400 in this manner has the advantage of likely being a more accurate indication of when the generator power source 400 is actually on, since counting the runtime by monitoring the voltage of the power received may be thwarted if a conductor conveying the power from the generator power source 400 is disconnected. In still other embodiments where the transfer control 140 sends a signal to the generator power source 400 to turn on or to turn off (regardless of whether this is done by the processor 144, or not), the processor 144 is caused to count the passage of time between instances of sending a signal to turn on and subsequent instances of sending a signal to turn off.

As the processor 144 maintains the runtime count, the processor 144 compares the runtime count to at least one piece of data within the generator data 147 concerning a maintenance procedure for the generator power source 400. If the runtime count reaches a value that corresponds to the maintenance procedure, then the processor 144 operates the user interface device 149 to provide an operator of the transfer switch 100 with an indication of a need to carry out the maintenance procedure. In this way, an operator of the transfer switch 100 is prompted to carry out the maintenance procedure when the runtime count reaches a value indicating that the generator power source 400 has been in operation long enough that the maintenance procedure should be performed. The indication to the operator is provided in a form that identifies the maintenance procedure, such as without limitation, a textual name or description of the maintenance procedure, or a picture or graphic symbol associated with the maintenance procedure. The indication to the operator preferably does not require an operator having some familiarity with the generator power source 400 to refer to a manual or other source of information to identify what the maintenance procedure is.

In some embodiments, the generator data 147 incorporates data concerning multiple maintenance procedures applicable to the generator power source 400. In other embodiments, the generator data 147 incorporates data concerning multiple maintenance procedures applicable to multiple forms of generator power source, including the generator power source 400, thereby allowing the transfer switch 100 to be more readily incorporated into other transfer switch installations having other generator power sources. Regardless of whether the generator data 147 incorporates data concerning maintenance procedures for more than one form of generator power source or solely the generator power source 400, the generator data 147 may additionally incorporate the contents of one or more operator manuals for one or more generator power sources.

In some embodiments, at least a portion of the generator data 147 is entered into the storage 145 by an operator of the transfer switch 100, either through the user interface device 149, or by other suitable means such as, and without limitation, a remote terminal (not shown) suitably connected to the transfer control 140. In other embodiments, at least a portion of the generator data 147 is supplied through the vendor of the transfer switch 100 and/or the transfer control 140, either through removable media read by a removable media device (not shown) connected to the transfer control 140, or through other suitable mechanisms including, without limitation, an interface (not shown) between the processor 144 and a network (not shown) or the internet (not shown) by which at least a portion of the generator data 147 is downloaded.

The processor 144 is further caused by the control program 146 to operate the user interface device 149 to provide a user of the transfer switch 100 with one or more indications of status of the generator power source 400 and/or of the transfer switch 100. Depending on the types of sensors and/or other inputs received by the transfer control 140, the user interface device 149 may provide one or more indications of voltages, current flow and/or other characteristics of power provided by one or both of the utility power source 300 and the generator power source 400. The user interface device 149 may also provide the state of the power switching device 110 (i.e., which one of the utility power source 300 and the generator power source 400 is selected by the power switching device 110), and/or of one or both of the service disconnects 120 and 130, if present. The user interface device 149 may further provide an indication of previously occurring events, such as previous changes in the selection of a power source by the power switching device 110, regardless of whether such changes were due to manual or automated operation of the power switching device 110. One or more lights, alphanumeric displays, dot-matrix displays, analog gauges, voice synthesizers, audible alarms, and/or other devices may be incorporated into the user interface device 149 to provide one or more of these indications to a user of the transfer switch 100.

The user interface device 149 may also provide an indication of the runtime count maintained by the processor 144. The runtime count may be in any of a wide variety of possible units of time measure, including but limited to, seconds, minutes, hours, multiples of hours, days, or multiples of days. The user interface device 149 may provide a control for resetting the runtime count to a predetermined initial value (e.g., without limitation, resetting to 0, or resetting to a known period of time during which the generator power source 400 may have somehow been turned on without the runtime count having been maintained to count that period of time).

Figure 2:
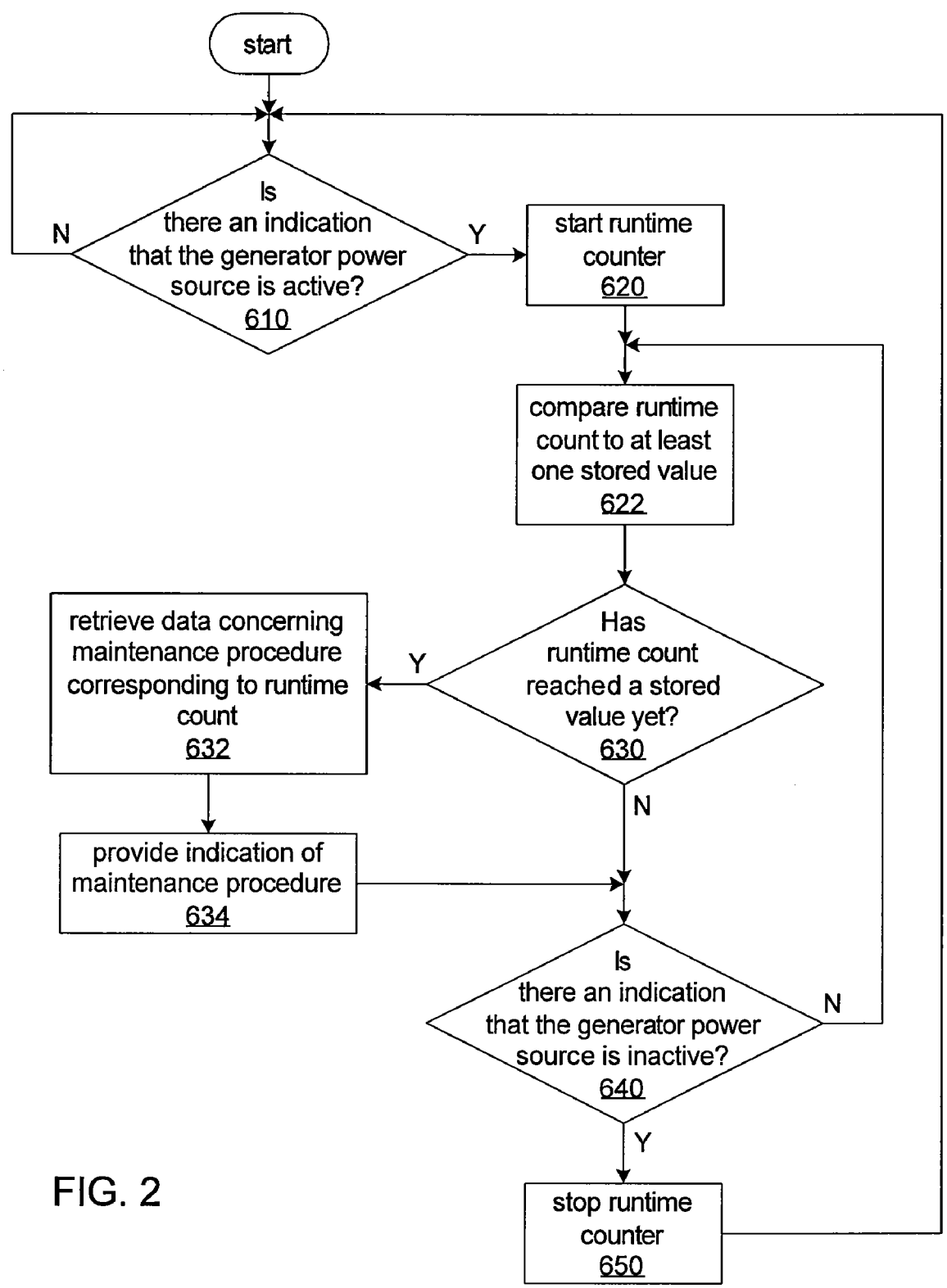
FIG. 2 is a flowchart of monitoring a generator power source and indicating a need for a maintenance activity in accordance with another embodiment of the invention.

FIG. 2 shows a procedure for the monitoring of a generator power source by a transfer switch. When, at 610, there is an indication that the generator power source is active, then the runtime counter is started at 620. In some embodiments, this indication may be the provision of power from the generator power source that has a voltage or other characteristic meeting a predetermined threshold. In other embodiments, this indication be a signal (e.g., without limitation, an electrical, optical or radio frequency signal) from the generator power source indicating that the generator power source is currently on. In still other embodiments, this indication may be the transmission of a signal (e.g., without limitation, an electrical, optical or radio frequency signal) by the transfer switch to the generator power source to turn on.

At 622, the runtime count maintained by the runtime counter is compared to at least one stored value, and at 630, if the runtime count reaches a stored value, then data concerning a maintenance procedure corresponding to the runtime count is retrieved at 632, and an indication of a need to perform the maintenance procedure is provided at 634. Regardless of whether the runtime count is determined at 630 to have reached a stored value, or not, as long as there is no indication at 640 of the generator power source being inactive, comparisons of the runtime count to at least one stored value will continue to be made at 622, and checks as to whether a stored value has been reached will continue to be made at 630. However, if at 640, there is an indication that the generator power source is inactive, then the runtime counter is stopped at 650, and the next indication of the generator power source being active is again awaited at 610.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A transfer switch for a first power source, a second power source, and a load, said transfer switch comprising:
   a power switching device structured to select between the first power source and the second power source and to supply power to the load; and
   a transfer control structured to monitor the second power source, to maintain a runtime count of the second power source, to identify a maintenance procedure corresponding to the runtime count, and to provide an indication of a need to perform the maintenance procedure.

2. The transfer switch of claim 1, wherein the transfer control is further structured to signal the second power source to turn on and to turn off, and is further structured to count the runtime of the second power source from an instance of signaling the second power source to turn on to an instance of signaling the second power source to turn off.

3. The transfer switch of claim 1, wherein the transfer control is further structured to monitor power supplied by the second power source to the power switching device, and is further structured to count the runtime of the second power source by counting the time during which the second power source supplies power having a characteristic that meets a predetermined operating parameter to the power switching device.

4. The transfer switch of claim 1, wherein the transfer control is further structured to monitor a status signal from the second power source, and to count the runtime of the second power source by counting the time during which the status signal indicates that the second power source is operating.

5. The transfer switch of claim 1, wherein the second power source includes a starting battery having a voltage, and wherein the transfer control is further structured to monitor the voltage and to provide a signal when the voltage falls below a predetermined value for a predetermined period of time.

6. The transfer switch of claim 1, wherein the transfer control is further structured to monitor a quantity of fuel available to the second power source, and to provide a signal when the quantity of fuel falls below a predetermined value.

7. The transfer switch of claim 1, wherein said transfer control comprises a storage and a processor structured to locate a piece of data in the storage concerning the maintenance procedure.

8. The transfer switch of claim 7, wherein the piece of data is an identifier of the maintenance procedure, and wherein the transfer control is further structured to display the identifier of the maintenance procedure.

9. The transfer switch of claim 7, wherein the storage stores data concerning a plurality of maintenance procedures.

10. The transfer switch of claim 9, wherein the maintenance procedures apply to a plurality of models of power generator sources, and wherein the second power source is selected from among the models of power generator sources.

11. The transfer switch of claim 10, wherein the transfer control is further structured to enable selection of the second power source from among the models of power generator sources by an operator of the transfer switch.

12. A method of monitoring a second power source structured to provide power to a transfer switch including a power switching device, said power switching device being structured to receive power from a first power source and the second power source, said power switching device being operated by a transfer control, said method comprising:
   maintaining a runtime count of the second power source at the transfer switch;
   identifying a maintenance procedure corresponding to the runtime count; and
   providing an indication of a need to perform the maintenance procedure.

13. The method of claim 12, said method further comprising signaling the second power source to turn on or to turn off, and counting the runtime of the second power source from an instance of signaling the second power source to turn on to an instance of signaling the second power source to turn off.

14. The method of claim 12, said method further comprising monitoring power supplied by the second power source to the power switching device, and counting the runtime of the second power source by counting the time during which the second power source supplies power having a characteristic that meets a predetermined operating parameter to the power switching device.

15. The method of claim 12, said method further comprising monitoring a status signal from the second power source, and counting the runtime of the second power source by counting the time during which the status signal indicates that the second power source is operating.

16. The method of claim 12, said method further comprising monitoring a voltage of a starting battery of the second power source, and providing a signal when the voltage falls below a predetermined value for a predetermined period of time.

17. The method of claim 12, said method further comprising monitoring a quantity of fuel available to the second power source, and providing a signal when the quantity falls below a predetermined value.

18. The method of claim 12, said method further comprising identifying a piece of data concerning the maintenance procedure, said piece of data being an identifier of the maintenance procedure, and displaying the piece of data.

19. The method of claim 12, said method further comprising storing data concerning a plurality of maintenance procedures.

20. The method of claim 19, wherein the maintenance procedures apply to a plurality of models of power generator sources, said method further comprising selecting the second power source from among the models of power generator sources.

21. The method of claim 20, said method further comprising enabling selection of the second power source from among the models of power generator sources by an operator of the transfer switch.

* * * * *